United States Patent
Hogan

(10) Patent No.: US 9,868,853 B2
(45) Date of Patent: *Jan. 16, 2018

(54) USES OF BIOBASED STYRENE

(71) Applicant: Bridgestone Corporation, Chuo-ku (JP)

(72) Inventor: Terrence E. Hogan, Uniontown, OH (US)

(73) Assignee: Bridgestone Corporation, Chuo-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/364,574

(22) Filed: Nov. 30, 2016

(65) Prior Publication Data

US 2017/0081507 A1     Mar. 23, 2017

Related U.S. Application Data

(63) Continuation of application No. 14/441,404, filed as application No. PCT/US2013/069232 on Nov. 8, 2013, now Pat. No. 9,540,502.

(60) Provisional application No. 61/724,611, filed on Nov. 9, 2012.

(51) Int. Cl.
| | |
|---|---|
| *C08L 9/00* | (2006.01) |
| *C08L 9/06* | (2006.01) |
| *C08F 236/10* | (2006.01) |
| *C08F 212/08* | (2006.01) |

(52) U.S. Cl.
CPC .............. *C08L 9/06* (2013.01); *C08F 212/08* (2013.01); *C08F 236/10* (2013.01); *C08L 2201/06* (2013.01)

(58) Field of Classification Search
CPC ....... C08L 9/06; C08L 2201/06; C08F 236/10
See application file for complete search history.

(56) References Cited

U.S. PATENT DOCUMENTS

| | | | |
|---|---|---|---|
| 4,125,573 A | 11/1978 | Kruse | |
| 8,546,506 B2 | 10/2013 | McAuliffe et al. | |
| 2010/0216958 A1 | 8/2010 | Peters et al. | |

FOREIGN PATENT DOCUMENTS

| | | | | |
|---|---|---|---|---|
| CN | 102559769 A | 7/2012 | | |
| CN | 102559769 B | 7/2014 | | |
| EP | 2 543 654 A1 | * 1/2013 | .............. | B01J 29/18 |
| EP | 2543654 A1 | 1/2013 | | |
| EP | 2883909 A1 | 6/2015 | | |
| FR | 2943351 B1 | 4/2011 | | |
| WO | 201053950 A2 | 5/2010 | | |
| WO | 2012102290 A1 | 8/2012 | | |
| WO | 2012122333 A1 | 9/2012 | | |
| WO | 2012178126 A1 | 12/2012 | | |

OTHER PUBLICATIONS

Response filed in European patent application No. 13798445.6 dated Nov. 11, 2016.
Second Office Action from application CN2013800696914, dated Feb. 28, 2071.
Narayan, Ramani, "Biobased & Biodegradable Plastics 101" presentation, downloaded from www.msu.edu/user/narayan in Oct. 2012.
Dynamic Mechanical Properties of Passenger and Light Truck Tire Treads, by the U.S. Department of Transportation, National Highway Traffic Safety Administration, Feb. 2010.
Communication pursuant to Article 94(3) EPC in application EP13798445.6, dated Aug. 22, 2016.
First Office Action from application CN2013800696914, dated Sep. 12, 2016.
Response filed in European patent application No. 13798445.6 dated Dec. 21, 2015.
Mensah, Laure, International Search Report with Written Opinion from PCT/US2013/069232, 11 pages. (dated Apr. 4, 2014).
Miranda, Maria O., et al., "Catalytic decarbonylation of biomass-derived carboxylic acids as efficient route to commodity monomers," Green Chemistry, vol. 14, pp. 490-494 (2012).
Toussaint, W.J., et al., "Production of Butadiene from Alcohol," Ind. Eng. Chem., vol. 39, issue 2, pp. 120-125 (Feb. 1947).
Office action from Japanese patent application No. 2015-541940 (dated Sep. 19, 2017).

* cited by examiner

*Primary Examiner* — Robert Harlan
(74) *Attorney, Agent, or Firm* — Meredith E. Hooker; Jenny L. Sheaffer

(57) ABSTRACT

Disclosed herein ARE various uses of styrene monomers derived from biobased material and containing modern carbon atoms, including in copolymers, in rubber compositions, in tire components, and to balance the viscoelastic properties of a rubber composition containing the styrene monomer.

22 Claims, No Drawings

USES OF BIOBASED STYRENE

CROSS REFERENCE TO RELATED APPLICATIONS

This application is a continuation of U.S. application Ser. No. 14/441,404, filed May 7, 2015, which is a U.S. national stage of International Application No. PCT/US2013/069232, filed Nov. 8, 2013, which claims priority to U.S. Provisional Application Ser. No. 61/724,611, filed Nov. 9, 2012, all of which are hereby incorporated by reference in their entirety.

FIELD OF THE DISCLOSURE

The present disclosure relates to various uses of styrene monomers derived from biobased material containing modern carbon atoms, including in polymers or copolymers, in rubber compositions, in tire components, and to balance the viscoelastic properties of a rubber composition containing the styrene monomer.

BACKGROUND

Styrene is a common raw material of rubbery copolymers, such as styrene-butadiene copolymers (SBR), styrene-isoprene copolymers, and styrene-isoprene-butadiene copolymers (SIBR). These rubbery copolymers are often used in vulcanizable rubber compositions suitable for different components of tires, e.g., the tread, the bead, the sidewall, etc. Styrene raw materials used on an industrial scale are typically derived from petroleum-based hydrocarbons. Styrene is typically produced via the alkylation of petroleum-derived benzene with petroleum-derived ethylene.

Petrochemical-based hydrocarbons are fossil fuels, which by their nature, do not contain any "modern" carbon. Modern carbon, as defined herein, refers to the standard set forth in ASTM D6866. Generally speaking, under this standard, modern carbon contains the same $^{14}C$ activity level (including the post-1950 correction) as the original oxalic acid radiocarbon standard (SRM 4990b). $^{14}C$, also known as carbon-14 or radiocarbon, is a radioactive isotope of carbon that occurs naturally and is found in plants and animals at approximately the same concentration found in the atmosphere. Due to radioactive decay, fossil fuels lack any measurable $^{14}C$ activity, and, therefore, do not contain any modern carbon. Newer organic materials, including the biobased materials disclosed herein, will display $^{14}C$ activity, and therefore will contain modern carbon.

SUMMARY

Disclosed herein are various uses of styrene monomers derived from biobased material and containing modern carbon atoms, including in polymers or copolymers, in rubber compositions, in tire components, and to balance the viscoelastic properties of a rubber composition containing the styrene monomers.

Disclosed herein is a polymer or copolymer based upon styrene monomer and optionally including conjugated-diene monomer, wherein the polymer or copolymer comprises at least 50 weight percent of the styrene monomer, and the styrene monomer contains 50-100% modern carbon atoms.

Also disclosed herein is a method for balancing the viscoelastic properties of a rubber composition comprising incorporation of at least 50 phr of a polymer or copolymer based upon styrene monomer and optionally including conjugated-diene monomer, wherein the polymer or copolymer comprises at least 50 weight percent of the styrene monomer, and the styrene monomer contains 50-100% modern carbon atoms.

Other aspects of the present disclosure will be apparent from the description that follows.

DETAILED DESCRIPTION

Disclosed herein are polymers and copolymers based upon styrene monomers derived from biobased material containing modern carbon atoms, rubber compositions containing such polymers or copolymers, and methods for balancing the viscoelastic properties of a rubber composition by incorporating the polymers or copolymer. Also disclosed are tire components containing the rubber compositions disclosed herein.

Disclosed herein is a polymer or copolymer based upon styrene monomer and optionally including conjugated-diene monomer, wherein the polymer or copolymer comprises at least 50 weight percent of the styrene monomer, and the styrene monomer contains 50-100% modern carbon atoms.

Also disclosed herein is a method for balancing the viscoelastic properties of a rubber composition comprising incorporation of at least 50 phr of a polymer or copolymer based upon styrene monomer and optionally including conjugated-diene monomer, wherein the polymer or copolymer comprises at least 50 weight percent of the styrene monomer, and the styrene monomer contains 50-100% modern carbon atoms.

Biobased Styrene Monomers

Styrene monomers serve as a raw material for many different rubbery copolymers. As mentioned above, styrene used on an industrial scale is typically derived from petroleum, which is a non-renewable fossil fuel. The styrene disclosed herein, in contrast, is at least partially derived from a biobased material. The term "biobased," unless otherwise indicated herein, refers to organic materials derived from biologic sources, i.e., living sources. Biobased materials are typically renewable in the sense that they are able to biologically or naturally replenish over time. Non-limiting broad types of biobased material includes animal material, plant material, and combinations thereof.

Biobased materials contain modern carbon as defined by ASTM D6866. Under this standard, modern carbon has the same $^{14}C$ activity level (including the post-1950 correction, i.e., 0.95 times the concentration of the $^{14}C$) as the original oxalic acid radiocarbon standard (SRM 4990b). Thus, an entire source of carbon that has the same activity level, after the post-1950 correction, as the original oxalic acid radiocarbon standard has 100% modern carbon atoms (the % modern carbon atoms may also be referred to as percent modern carbon or pMC). Conversely, any carbon source that lacks any $^{14}C$ activity does not have any modern carbon atoms. A carbon source that lacks $^{14}C$ activity is a fossil carbon source.

In accordance with one or more embodiments, a styrene monomer derived from a biobased styrene source material is disclosed. The styrene monomer comprises 50% to 100% modern carbon atoms. In certain embodiments, the styrene monomer contains 75% to 100%, and in other embodiments 100% modern carbon atoms.

In accordance with one or more embodiments, the styrene monomer derived from a biobased styrene source material, and containing the percentages of modern carbon atoms as discussed above, meets at least one of the following: (a) contains at least 0.5% by weight styrene-derived impurities, preferably at least 1% by weight styrene-derived impurities, and/or (b) is produced from cinnamic acid. In certain exemplary embodiments, the styrene-derived impurities comprise styrene dimers, styrene trimers, and hydroxy-substituted styrene compounds. More specific examples of the styrene-derived impurities include ethylbenzene, 1-phenyl-ethanol, styrene dimer, styrene trimer, bis(1-phenyl-ethyl)ether, and 1,3-diphenyl-3-hydroxy-1-butene. Thus, in certain exemplary embodiments, the styrene-derived impurities comprise one or more of: ethylbenzene, 1-phenyl-ethanol, styrene dimer, styrene trimer, bis(1-phenyl-ethyl)ether, and 1,3-diphenyl-3-hydroxy-1-butene.

Suitable sources of biobased styrene source materials include cinnamic acid, derivatives of cinnamic acid, syngas (i.e., biobased syngas such as syngas from biomass), methane (i.e., biobased methane such as methane from biomass), ethanol, butanol, and combinations thereof. In accordance with the embodiments disclosed herein, each of these biobased source materials comprise organic materials derived from biologic sources. For example, cinnamic acid can be obtained from cinnamon oil; resinous exudates from balsam trees, e.g., storax; fat extracts from shea trees, e.g., shea butter; and deamination of L-phenylalanine made from biomass. Biobased derivatives of cinnamic acid, such as hydrocinnamic acid, are, as their name implies, derived from biobased cinnamic acid. Biobased hydrocinnamic acid can be obtained by hydrogenating biobased cinnamic acid. Biobased syngas, which typically contains hydrogen, carbon monoxide, and carbon dioxide, can be obtained through the gasification of biomass. Biobased methane can be produced by the catalytic conversion of a biobased syngas. Biobased butanol and biobased ethanol, can be produced by the fermentation of biomass. For example, each of butanol and ethanol can be produced by the acetone-butanol-ethanol method of fermentation, which is the bacterial fermentation of carbohydrates such as starch in the absence of oxygen. Biobased ethanol can also be produced from yeast fermentation of carbohydrates such as cellulose.

In accordance with one or more embodiments, styrene is produced from at least one of biobased cinnamic acid or biobased derivatives of cinnamic acid in the following manner. The biobased cinnamic acid is first hydrogenated to produce a biobased hydrocinnamic acid. Alternatively, this process may start with a biobased hydrocinnamic acid source material. In either instance, the biobased hydrocinnamic acid is then decarbonylated using palladium, rhodium, iridium, platinum, or nickel catalysts in the presence of an organic anhydride, such as pivalic anhydride, maleic anhydride, succinic anhydride, anhydrides of fatty acids containing from 4 to 36 carbon atoms, and the like; and a phosphine ligand, such as triphenylphosphine, bis(2-diphenylphosphinophenyl)ether (DPEphos), 9,9-dimethyl-4,5-bis(diphenylphosphino)xanthene (Xantphos), 1,3-bis(diphenylphosphino)propane, 1,3-bis(diphenylphosphino)ethane, and the like; to produce the styrene monomer. Nonlimiting specific examples of the catalysts include $PdCl_2$, $PdI_2$, $PdBr_2$, and the like. Nonlimiting specific examples of the anhydrides of fatty acids containing from 4 to 36 carbon atoms include decanoic anhydride, dodecanoic anhydride, and the like. A specific example of this process is described in the Examples of the present disclosure. In this specific example, a biobased hydrocinnamic acid, pivalic anhydride, a palladium catalyst, i.e., $PdCl_2$, and a phosphine ligand, i.e., triphenylphosphine, are loaded into the reaction vessel in an inert atmosphere. The vessel is heated, during which styrene, carbon monoxide, and pivalic acid are produced via the metal-catalyzed decarbonylation of the hydrocinnamic acid.

In one or more embodiments, the styrene produced by this process can be isolated from any residual reactants, catalyst residue, and other reaction products by any means known in the art, such as extraction, filtration, chromatography, and combinations thereof. In certain embodiments, it is advantageous to not separate the resulting carboxylic acids or neutralized carboxylic acids from the products of this process. In other words, the styrene monomer is isolated along with any resulting carboxylic acids or neutralized carboxylic acids. Thus, in certain embodiments, the isolation of the styrene shown in the Examples can be altered to retain both the biobased styrene and the carboxylic acid residue or the salt of carboxylic acid residue, e.g., any carboxylic acid residue neutralized with a suitable base, such as sodium hydroxide, present in the mixture. The carboxylic acid or carboxylic acid salt present in the mixture may be useful as an emulsifying agent when the styrene monomer is used in emulsion polymerization reactions, which are discussed in greater detail below.

Alternatively, the biobased cinnamic acid itself can be decarboxylated to form the styrene monomer. This can be done using a decarboxylase enzyme.

In accordance with one or more embodiments, styrene is produced from at least one of a biobased source material that include syngas, methane, ethanol, and butanol in the following manner. Styrene is also known as vinyl benzene, which may be produced by the dehydrogenation of ethylbenzene. The at least one of biobased syngas, biobased methane, biobased ethanol, biobased butanol, and combinations thereof can be used to form the intermediate constituent components used to form ethylbenzene, which in turn is dehydrogenated to form styrene. For example, ethylbenzene can be formed by the alkylation of ethylene and benzene. A biobased ethylene is obtained by dehydration of biobased ethanol. Biobased benzene is formed by the aromatization of biobased methane, which as discussed above, can be derived from the catalytic conversion of biobased syngas. Alternatively, benzene can be formed by the aromatization of butane, which can be formed by the dehydration of biobased butanol. In accordance with the styrene disclosed herein, any or all of the source materials used in this manner to form styrene, i.e., used to form the intermediate constituent components of styrene, are biobased. In other words, at least one of syngas, methane, ethanol, and butanol used to form the styrene disclosed herein is biobased.

Polymers and Copolymers Produced from the Biobased Styrene Monomer

In accordance with one or more embodiments, a polymer or copolymer is produced that is based upon the biobased styrene monomers discussed herein. It should be understood that the styrene monomers upon which the polymer or copolymer is based, are those biobased styrene monomer discussed above. The polymer or copolymer is produced from styrene monomers containing from 50% to 100% modern carbon atoms, and in certain embodiments, from 75% to 100% modern carbon atoms, and in other embodiments 100% modern carbon atoms. The resulting polymer or copolymer is polymerized from the styrene monomer described herein and optionally a conjugated-diene monomer.

In accordance with certain embodiments, the at least one other monomer (in addition to the styrene monomer) is a conjugated diene-containing monomer and the resulting copolymer produced is a conjugated diene-containing copolymer. Non-limiting examples of conjugated diene-containing monomers suitable for use in the disclosed copolymers include 1,3-butadiene, isoprene, 1,3-pentadiene, 2,3-dimethyl-1,3-butadiene, 1,3-hexadiene, 2-methyl-1,3-pentadiene 3,4-dimethyl-1,3-hexadiene, 4,5-diethyl-1,3-octadiene, 3-butyl-1,3-octadiene, phenyl-1,3-butadiene, and combinations thereof.

In accordance with one or more embodiments, the polymer or copolymer produced using the styrene derived from the biobased source material is polystyrene, styrene-butadiene copolymer, styrene-isoprene copolymer, or styrene-isoprene-butadiene. A styrene-butadiene copolymer is produced by polymerizing the styrene monomer disclosed herein in the presence of a 1,3-butadiene monomer. The polymer or copolymer can be produced using anionic polymerization or emulsion polymerization. The anionic polymerization generally takes place in solution. The anionic and emulsion polymerization techniques are discussed in greater detail below. The percent modem carbon content of the resulting polymer or copolymer will primarily depend on the percent modem carbon content of the respective styrene monomer and 1,3-butadiene monomer, if any, used in the polymerization. Generally, the higher the percent modem carbon content for the monomer(s), the higher the percent modem carbon content for the overall copolymer.

In one or more embodiments, when only the styrene monomer is utilized or contains modern carbon atoms, the polymer or copolymer contains 5% to 60% modem carbon atoms, and in certain embodiments, from 20% to 50% modem carbon atoms, and in other embodiments from 25% to 40% modem carbon atoms.

In other embodiments, a conjugated diene monomer such as 1,3-butadiene is used to produce the copolymer, and that conjugated diene monomer is derived from a biobased source material and therefore itself contains modem carbon atoms. In such embodiments, the conjugated-diene monomer itself contains from 25% to 100% modem carbon atoms, including in certain embodiments from 50% to 100% modem carbon atoms, and in other embodiments from 75% to 100% modem carbon atoms. When both the styrene monomer and the conjugated diene monomers contain modem carbon atoms in accordance with the present embodiment, the resulting copolymer contains from 25% to 100% modem carbon atoms, including in certain embodiments from 50% to 99.99% modem carbon atoms, and in other embodiments from 75% to 99.99% modern carbon atoms. A non-limiting example of a suitable biobased butadiene source material is biobased ethanol. The process for converting the biobased ethanol to biobased butadiene is well known and can be done in accordance with the process described in Toussaint, W. J. et al., "Production of Butadiene from Alcohol," *Ind. Eng. Chem.,* 1947, 39 (2), pp. 120-125, the contents of which are incorporated herein by reference.

As mentioned above, the percent modern carbon content of the resulting polymer or copolymer depends on the modern carbon content of the constituent monomer(s), i.e., the styrene monomer and any conjugated-diene monomer utilized, as well as certain materials used during the polymerization reaction, such as catalysts, solvents, initiating agents, terminating agents, etc., that may add one or more carbons to the resulting copolymer. It is possible to obtain a copolymer having 100% modem carbon atoms if all monomer(s), i.e., the styrene monomer and any conjugated-diene monomer utilized, contain 100% modern carbon atoms and no substitution reactions with non-modern carbon atoms occur during polymerization, e.g., via an initiator or a quenching agent. This is possible using a electron transfer initiators, such as lithium naphthalenide, in anionic polymerization reactions such as those described in Quirk, R. P. et al., ANIONIC POLYMERIZATION: PRINCIPLES AND PRACTICAL APPLICA-TIONS, Marcel Dekker, Inc., 1996, pp. 104-108, which is incorporated herein by reference. Using other types of initiators may result in 100% or slightly less than 100%, e.g., 99.99%, of modem carbon atoms in the resulting polymer or copolymer.

In accordance with one or more of the preceding embodiments, a styrene-butadiene copolymer is produced that contains 10% to 60% of bound styrene by total weight of the copolymer, including in certain embodiments from 15% to 50% of bound styrene, and in other embodiments, from 20% to 40% of bound styrene.

The styrene-butadiene copolymers disclosed herein may also be described in terms of the amount of microblock styrene structure of the copolymer. The term "microblock" as used herein refers to blocks within a copolymer that contains a continuous run of 3 to 10 styrene units, i.e., 3 to 10 styrene units in a row without intervening butadiene monomers. In accordance with one or more embodiments, the styrene-butadiene monomers disclosed herein may contain up to 60% by weight of the total styrene present in the copolymer in microblock form, i.e., 0 to 60% of the styrene in microblock form, and in certain other embodiments, from 10 to 40% or from 20% to 30% of the styrene in microblock form.

In accordance with one or more embodiments, the resulting conjugated diene-containing copolymer produced using the styrene derived from the biobased source material is a styrene-isoprene copolymer. The styrene-isoprene copolymer is produced by polymerizing the styrene monomer disclosed herein in the presence of an isoprene monomer. This copolymer can be produced using anionic polymerization or emulsion polymerization according to the anionic and emulsion polymerization techniques discussed in greater detail below.

In certain embodiments, the isoprene monomer used to produce the styrene-isoprene copolymer is derived from a biobased isoprene source material and therefore contains modem carbon atoms. In such embodiments, the isoprene monomer itself contains from 25% to 100% modem carbon atoms, including in certain embodiments from 50% to 100% modern carbon atoms, and in other embodiments from 75% to 100% modem carbon atoms. When both the styrene monomer and the isoprene monomer contain modem carbon atoms in accordance with the present embodiment, the resulting styrene isoprene copolymer contains from 25% to 100% modem carbon atoms, including in certain embodiments from 50% to 99.99% modem carbon atoms, and in other embodiments from 75% to 99.99% modem carbon atoms. A non-limiting example of a suitable biobased isoprene source material includes biobased butanols, pentanols, and combinations, thereof, which can be obtained by thermochemical or fermentation processing of biomass. The process for converting these biobased alcohols to isoprene is described in U.S. Patent Application Publication No. 2010/0216958, the contents of which are incorporated herein by reference. Alternatively, examples of a biobased isoprene source include carbohydrates, glycerol, glycerine, dihydroxyacetone, single-carbon sources, animal fat, animal oils, fatty acids, lipids, phospholipids, glycerolipids, monoglycerides, diglycerides, triglycerides, polypeptides, yeast extracts, and combinations thereof. The process for converting these biobased sources to isoprene is described in U.S. Patent Application Publication No. 2011/0237769, the contents of which are incorporated herein by reference.

In accordance with one or more embodiments, the resulting conjugated diene-containing copolymer produced using the styrene derived from the biobased source material is a block copolymer such as styrene-butadiene-styrene (SBS) or styrene-isoprene-styrene (SIS). Block copolymers such as SBS and SIS are generally made by anionic polymerization processes wherein the first S block is made by polymerizing styrene monomer alone (i.e., in the absence of any 1,3-butadiene or isoprene) to completion, then adding 1,3-butadiene monomer or isoprene monomer and polymerizing to form the second B or I block, and finally adding another charge of styrene monomer to form the final S block. Block copolymers such as SBS and SIS contain all or essentially all of their styrene content in block form. In other words, such block copolymers contain either no or very minimal amounts of styrene monomers next to a butadiene or isoprene monomer other than the styrene monomer at the end of the first block and at the beginning of the third block. The percent modem carbon content of the resulting block copolymer will primarily depend on the percent modem carbon content of the respective styrene and 1,3-butadiene or isoprene monomers used in the polymerization. Generally, the higher the percent modem carbon content for each monomer, the higher the percent modem carbon content for the overall copolymer.

In one or more embodiments, when only the styrene monomer contains modem carbon atoms, the SBS or SIS block copolymer contains 5% to 60% modem carbon atoms, and in certain embodiments, from 20% to 50% modem carbon atoms, and in other embodiments from 25% to 40% modem carbon atoms. In other embodiments the 1,3-butadiene or the isoprene used to produce the block copolymer is also derived from a respective biobased butadiene or isoprene source material and therefore itself contains modem carbon atoms. In such embodiments, the 1,3-butadiene monomer or isoprene monomer itself contains from 25% to 100% modem carbon atoms, including in certain embodiments from 50% to 100% modem carbon atoms, and in other embodiments from 75% to 100% modem carbon atoms. When both the styrene monomer and either the 1,3-butadiene or the isoprene monomer contain modem carbon atoms in accordance with the present embodiment, the resulting block copolymer contains from 25% to 100% modem carbon atoms, including in certain embodiments from 50% to 99.99% modem carbon atoms, and in other embodiments from 75% to 99.99% modem carbon atoms.

In accordance with one or more embodiments, the resulting conjugated diene-containing copolymer produced using the styrene derived from the biobased source material is a styrene-isoprene-butadiene copolymer. The styrene-isoprene-butadiene copolymer is produced by polymerizing the styrene monomer disclosed herein in the presence of an isoprene monomer and a 1,3-butadiene monomer. This copolymer can be produced using anionic polymerization or emulsion polymerization techniques that are discussed in greater detail below. As is the case for the copolymers discussed above, the percent modem carbon content of the resulting styrene-isoprene-butadiene copolymer will primarily depend on the percent modem carbon content of the respective styrene, the isoprene, and the 1,3-butadiene monomers used in the polymerization. Generally, the higher the percent modem carbon content for each monomer, the higher the percent modem carbon content for the overall copolymer.

In one or more embodiments, when only the styrene monomer contains modem carbon atoms, the styrene-isoprene-butadiene copolymer contains 5% to 60% modem carbon atoms, and in certain embodiments, from 20% to 50% modem carbon atoms, and in other embodiments from 25% to 40% modem carbon atoms.

In other embodiments, at least one of the isoprene monomer and the 1,3-butadiene monomer used to produce the styrene-isoprene-butadiene copolymer is derived from a biobased source material and therefore contains modem carbon atoms. Examples of suitable biobased source materials for isoprene and 1,3-butadiene include, but are not limited to, those biobased source materials for isoprene and 1,3-butadiene disclosed herein. In such embodiments, the isoprene monomer itself may contain from 25% to 100% modem carbon atoms, including in certain embodiments from 50% to 100% modem carbon atoms, and in other embodiments from 75% to 100% modem carbon atoms. In addition, the 1,3-butadiene monomer itself may contain from 25% to 100% modem carbon atoms, including in certain embodiments from 50% to 100% modem carbon atoms, and in other embodiments from 75% to 100% modem carbon atoms. When the styrene monomer, the isoprene monomer, and the 1,3-butadiene monomer all contain modem carbon atoms in accordance with the present embodiment, the resulting styrene butadiene copolymer contains from 25% to 100% modem carbon atoms, including in certain embodiments from 50% to 99.99% modem carbon atoms, and in other embodiments from 75% to 99.99% modem carbon atoms.

In accordance with one or more of the preceding embodiments, the styrene-isoprene-butadiene copolymer contains 10% to 60% of bound styrene by total weight of the copolymer, including in certain embodiments from 15% to 50% of bound styrene, and in other embodiments, from 20% to 40% of bound styrene.

The styrene-isoprene-butadiene copolymers disclosed herein may also be described in terms of the amount of microblock styrene structure of the copolymer. In accordance with one or more embodiments, the styrene-isoprene-butadiene monomers disclosed herein may contain up to 60% by weight of the total styrene present in the copolymer in microblock form, i.e., 0 to 60% of the styrene in microblock form, and in certain other embodiments, from 10 to 40% or from 20% to 30% of the styrene in microblock form.

In one or more embodiments, the polymer or copolymer resulting from the polymerization of the biobased styrene monomer and the optional conjugated-diene monomer is functionalized. The polymer or copolymer is functionalized at one or more of the polymer head, the polymer tail, and the polymer backbone (e.g., a functionalized side chain).

In certain embodiments where the polymer or copolymer is functionalized, the functionalization is added by the use of a functional initiators. Functional initiators are typically an organolithium compounds that additionally include other functionality, often one or more nitrogen atoms (e.g., substituted aldimines, ketimines, secondary amines, etc.) optionally pre-reacted with a compound such as diisopropenyl benzene. Many functional initiators are known in the art. Exemplary ones are disclosed in U.S. Pat. Nos. 5,153,159, 5,332,810, 5,329,005, 5,578,542, 5,393,721, 5,698,464, 5,491,230, 5,521,309, 5,496,940, 5,567,815, 5,574,109, 5,786,441, 7,153,919, 7,868,110 and U.S. Patent Application Publication No. 2011-0112263, which are incorporated herein by reference.

In one or more embodiments, the functional initiator includes a lithiated thioacetal such as a lithiated dithiane. Lithiated thioacetals are known and include those described in U.S. Pat. Nos. 7,153,919, 7,319,123, 7,462,677, and 7,612,144, which are incorporated herein by reference.

In one or more embodiments, the thioacetal initiators employed can be defined by the formula:

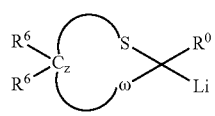

where each $R^6$ independently includes hydrogen or a monovalent organic group, $R^0$ includes a monovalent organic group, z is an integer from 1 to about 8, and ω includes sulfur, oxygen, or tertiary amino (NR, where R is an organic group).

In one or more embodiments, the functional initiators may be defined by the formula:

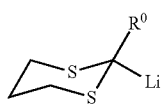

where $R^0$ includes a monovalent organic group.

Specific examples of functional initiators include 2-lithio-2-phenyl-1,3-dithiane, 2-lithio-2-(4-dimethylaminophenyl)-1,3-dithiane, and 2-lithio-2-(4-dibutylaminophenyl)-1,3-dithiane, 2-lithio-[4-(4-methylpiperazino)]phenyl-1,3-dithiane, 2-lithio-[2-(4-methylpiperazino)]phenyl-1,3-dithiane, 2-lithio-[2-morpholino]phenyl-1,3-dithiane, 2-lithio-[4-morpholin-4-yl]phenyl-1,3-dithiane, 2-lithio-[2-morpholin-4-yl-pyridine-3]-1,3-dithiane, 2-lithio-[6-morpholin-4-pyridino-3]-1,3-dithiane, 2-lithio-[4-methyl-3,4-dihydro-2H-1,4-benzoxazine-7]-1,3-dithiane, and mixtures thereof.

Polymerization of the Polymers or Copolymers

In accordance with one or more embodiments, the polymer or copolymer disclosed herein are produced using anionic polymerization. Anionic polymerization is a form of addition polymerization that occurs in three stages, chain initiation, chain propagation, and chain termination. In particular, anionically formed polymer or copolymer may be formed by reacting anionic initiators with certain unsaturated monomers, namely the styrene monomer disclosed herein and optionally the conjugated-diene monomer, to propagate a polymeric structure. Throughout formation and propagation of the polymer, the polymeric structure may be understood as "living," i.e., reactive. A new batch of monomer subsequently added to the reaction can add to the living ends of the existing chains and increase the degree of polymerization.

Anionic polymerizations are typically conducted as solution polymerizations, i.e., in a solvent, but may also be carried out as vapor phase polymerization or bulk polymerization. Suitable solvents for the anionic polymerization include a polar solvent, such as tetrahydrofuran (THF), or a non-polar hydrocarbon solvent, such as the various cyclic and acyclic hexanes (e.g., cyclohexane and hexane), heptanes, octanes, pentanes, their alkylated derivatives, and mixtures thereof, as well as benzene.

In certain embodiments where the polymer or copolymer is prepared by the solution polymerization, the total concentration of the monomers in the solution is preferably within a range of 5% to 50% by mass, more preferably 10% to 30% by mass. The content of styrene monomer in the mixture is preferably within a range of 3% to 50% by mass, more preferably 4% to 45% by mass. Also, the polymerization system is not particularly limited and may be a batch system or a continuous system.

The polymerization temperature in the anionic polymerization is preferably within a range of 0° C. to 150° C., more preferably 20° C. to 130° C. Also, such a polymerization may be carried out under a generating pressure, but it is preferable to be usually conducted under a pressure enough to keep the monomers used at substantially a liquid phase. When the polymerization reaction is carried out under a pressure higher than the generating pressure, the reaction system is preferable to be pressurized with an inert gas. Moreover, the starting materials used in the polymerization such as monomers, polymerization initiator, solvent and the like are preferable to be used after the reaction obstructing substances such as water, oxygen, carbon dioxide, protonic compound and the like are previously removed.

Suitable anionic initiators include organometallic compounds, such as organic alkali metal compounds. Specific examples of suitable organic alkali metal compounds include, but are not limited to, organolithium, organomagnesium, organosodium, organopotassium, tri-organotinlithium compounds, lithium naphthalenide, sodium naphthalenide, and combinations thereof. Examples of suitable organolithium compounds include, but are not limited to, n-butyl lithium, sec-butyl lithium, t-butyl lithium, and the like.

The amount of anionic initiator required to effect the desired polymerization can be varied over a wide range depending upon a number of factors, such as the desired polymer or copolymer molecular weight and the desired physical properties for the polymer or copolymer produced. In general, the amount of initiator utilized can vary from as little as 0.1 millimoles (mM) of lithium per 100 grams of monomers up to 100 mM of lithium per 100 grams of monomers, depending upon the desired copolymer molecular weight.

In order to promote randomization in copolymerization and to control vinyl content, a polar coordinator may be added to the polymerization ingredients. The amount of polar coordinator used depends on the amount of vinyl desired, the level of styrene employed and the temperature of the polymerization, as well as the nature of the specific polar coordinator (modifier) employed. Suitable polar coordinator include for example, ethers, or amines to provide the desired microstructure and randomization of the monomer units.

Types of compounds useful as polar coordinators include those having an oxygen or nitrogen heteroatom and a non-bonded pair of electrons. Suitable examples include, but are not limited to, dialkyl ethers of mono and oligo alkylene glycols; "crown" ethers; tertiary amines such as tetramethylethylene diamine (TMEDA); linear THF oligomers; and the like. Specific examples suitable polar coordinators include, but are not limited to, tetrahydrofuran (THF), linear and cyclic oligomeric oxolanyl alkanes such as 2,2-bis(2'-tetrahydrofuryl) propane, dipiperidyl ethane, dipiperidyl methane, hexamethylphosphoramide, N—N'-dimethylpiperazine, diazabicyclooctane, dimethyl ether, diethyl ether, tributylamine and the like. Linear and cyclic oligomeric oxolanyl alkane coordinators are described in U.S. Pat. No. 4,429,091, incorporated herein by reference.

To terminate the polymerization, and, thus, control the polymer or copolymer molecular weight, a quenching agent, coupling agent, or linking agent may be employed, all of these agents being collectively referred to herein as "terminating reagents." Useful terminating reagents include active hydrogen compounds such as water or alcohol. Certain of these reagents may provide the resulting polymer with functionality. That is, the polymers initiated according to the present disclosure, may carry the functional head group as discussed hereinabove, and may also carry a second functional group as a result of the terminating reagents, i.e., quenching agents, coupling agents, and linking agents used in the polymerization reaction.

Suitable functional terminating reagents are those disclosed in U.S. Pat. Nos. 5,502,131, 5,496,940 and 4,616,069, the contents of which are incorporated herein by reference, and include, but are not limited to, tin tetrachloride, $(R)_3SnCl$, $(R)_2SnCl_2$, $RSnCl_3$, carbodiimides, N-cyclic amides, N,N' disubstituted cyclic ureas, cyclic amides, cyclic ureas, isocyanates, Schiff bases, 4,4'-bis(diethylamino) benzophenone, alkyl thiothiazolines, carbon dioxide and the like. Other terminating reagents include the alkoxy silanes $Si(OR)_4$, $RSi(OR)_3$, $R_2Si(OR)_2$ cyclic siloxanes and mixtures thereof. The organic moiety R is selected from the group consisting of alkyls having from 1 to about 20 carbon atoms, cycloalkyls having from about 3 to about 20 carbon atoms, aryls having from about 6 to about 20 carbon atoms and aralkyls having from about 7 to about 20 carbon atoms. Typical alkyls include n-butyl, s-butyl, methyl, ethyl, isopropyl and the like. The cycloalkyls include cyclohexyl, menthyl and the like. The aryl and the aralkyl groups include phenyl, benzyl and the like. Preferred endcapping agents are tin tetrachloride, tributyl tin chloride, dibutyl tin dichloride, tetraethylorthosilicate and 1,3-dimethyl-2-imidazolidinone (DMI).

While terminating to provide a functional group on the terminal end of the polymer is preferred, it is further preferred to terminate by a coupling reaction, with for example, tin tetrachloride or other coupling agent such as silicon tetrachloride ($SiCl_4$), esters, and the like.

The amount of terminating agent required to effect the desired termination of the polymerization can be varied over a wide range depending upon a number of factors, such as the desired polymer or copolymer molecular weight and the desired physical properties for the polymer or copolymer produced. In general, the amount of terminating reagent utilized can vary from a molar ratio of 0.1:5 to 0.5:1.5 to 0.8:1.2 (terminating reagent:Li).

Anionically polymerized living polymers can be prepared by either batch, semi-batch or continuous methods. A batch polymerization is begun by charging a blend of the styrene monomer and at least one other monomer and solvent to a suitable reaction vessel, followed by the addition of the polar coordinator (if employed) and an initiator compound. The reactants are heated to a temperature of from about 20° C. to about 130° C. and the polymerization is allowed to proceed for from about 0.1 to about 24 hours. This reaction produces a reactive polymer having a reactive or living end. Preferably, at least about 30% of the polymer molecules contain a living end. More preferably, at least about 50% of the polymer molecules contain a living end. Even more preferably, at least about 80% contain a living end.

A continuous polymerization is begun by charging styrene monomer and at optionally a conjugated-diene monomer, initiator, and solvent at the same time in a suitable reaction vessel. Thereafter, a continuous procedure is followed that removes the product after a suitable residence time and replenishes reactants.

In a semi-batch polymerization the reaction medium and initiator are added to a reaction vessel, and the styrene monomer and at least one other monomer are continuously added over time at a rate dependent on temperature, monomer/initiator/modifier concentrations, etc. Unlike a continuous polymerization, the product is not continuously removed from the reactor. The resulting polymer from each of the batch, continuous, and semi-batch process is a polymer cement.

Anionic polymerization is further described in George Odian, PRINCIPLES OF POLYMERIZATION, Wiley Intersciences, Inc., $3^{rd}$ Ed. (1991), Ch. 5, which is incorporated herein by reference.

After formation of the polymer/copolymer cement, a processing aid(s) and other optional additives, such as oil, can be added to the polymer cement. The polymer or copolymer and other optional ingredients are then isolated from the solvent and preferably dried. Conventional procedures for desolventization and drying may be employed. In one embodiment, the polymer or copolymer is isolated from the solvent by steam desolventization or hot water coagulation of the solvent followed by filtration. Residual solvent can be removed by using conventional drying techniques such as oven drying or drum drying. Alternatively, the cement may be directly drum dried.

In accordance with one or more embodiments, the polymers or copolymers disclosed herein are produced using emulsion polymerization. Emulsion polymerization is a form of free radical polymerization. In one or more embodiments, a reaction vessel is charged with water, an emulsifying agent, the styrene monomer, the at least one other monomer, and a free radical initiator. The polymerization conversion may be controlled by adding the monomers in a step-wise manner, i.e., adding a portion of the total styrene monomer and the optional conjugated-diene monomer in a first step, then after achieving a desired conversion, adding additional portions of the styrene and at least one other monomers in subsequent steps to obtain a higher conversion rate. The emulsion polymerization reaction occurs from 0° C. to about 20° C., preferably from 0° C. to 10° C.

Examples of suitable free radical initiators include, but are not limited to potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl acetone peroxides dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutyronitrile, 2-t-butylazo-1-cyanocyclohexane, 1-t-amylazo-1-cyanocyclohexane, and the like; the various alkyl perketals, such as 2,2-bis-(t-butylperoxy)butane, ethyl 3,3-bis(t-butylperoxy)butyrate, 1,1-di-(t-butylperoxy) cyclohexane, and the like. These compounds are thermally unstable and decompose at a moderate rate to release free radicals. In certain embodiments, the combination of potassium persulfate with a mercaptan such as dodecyl mercaptan is commonly used to polymerize styrene-butadiene copolymers. The mercaptan generally acts as a chain transfer agent by reacting with one growing copolymer chain to terminate it and initiate growth of another chain. In certain embodiments, the mercaptan also acts as a free radical initiator through reaction with the persulfate. This activity by the mercaptan occurs at reactions taking place at higher temperatures. The amount of initiator employed will vary with the desired molecular weight of the copolymer being synthesized. Higher molecular weights are achieved by utilizing smaller quantities of the initiator and lower molecular weights are attained by employing larger quantities of the initiator.

Examples of suitable types emulsifying agents include, but are not limited to, anionic, nonionic, and cationic surfactants. More particularly, examples of emulsifying agents include various fatty acid soaps such as sodium stearate, rosin acid soaps, sodium lauryl sulfate, alpha olefin sulfonate, and the like.

Rubber Compositions Containing the Polymers or Copolymers

In accordance with one or more embodiments, the polymers or copolymers disclosed herein, are used in rubber compositions. As discussed in more detail herein, the polymers or copolymers, and rubber compositions containing such polymers or copolymers of this disclosure are particularly useful in tire components. These tire components can be prepared by using the polymers or copolymers of this invention alone or together with other rubbery polymers. Other rubbery polymers that may be used include natural and synthetic conjugated diene polymers or copolymers. The synthetic conjugated diene polymers or copolymers are typically derived from the polymerization of conjugated diene monomers as discussed above. These conjugated diene monomers may be copolymerized with other monomers such as vinyl aromatic monomers. Other rubbery conjugated diene polymers or copolymers may be derived from the polymerization of ethylene together with one or more alpha-olefins and optionally one or more diene monomers.

Examples of suitable rubbery polymers or copolymers that may be used in combination with the polymers or copolymers disclosed herein include natural rubber, synthetic polyisoprene, polybutadiene, polyisobutylene-isoprene copolymers, neoprene, ethylene-propylene copolymers, styrene-butadiene copolymers such as solution styrene-butadiene copolymers and emulsion styrene butadiene copolymers, styrene-isoprene copolymers, styrene-isoprene-butadiene copolymers, isoprene-butadiene copolymers, ethylene-propylene-diene copolymers, polysulfide rubber, acrylic rubber, urethane rubber, silicone rubber, epichlorohydrin rubber, and mixtures thereof. These rubbery polymers or copolymers can have varying macromolecular structures including linear, branched and star shaped structures. Preferred rubbery polymers or copolymers include natural rubber, polyisoprene, styrene-butadiene copolymers, and butadiene rubbers.

The rubber compositions include reinforcing fillers such as inorganic and organic fillers. Examples of common organic fillers include carbon black and starch. Examples of inorganic fillers include silica, aluminum hydroxide, magnesium hydroxide, clays (hydrated aluminum silicates), mica, and combinations thereof. Preferred fillers are carbon black, silica and combinations thereof.

The rubber compositions can be compounded with all forms of carbon black alone, or in a mixture with silica. The carbon black can be present in amounts ranging from about 5 to about 200 phr, with 5 to about 80 phr being preferred. When both carbon black and silica are employed in combination as the reinforcing filler, they are often used in a carbon black-silica ratio of about 10:1 to about 1:4. In certain embodiments, carbon black may be added in small amounts as an additive to provide coloring to the tire rather than for its filler functionality. In such embodiments, the carbon black to silica ratio is much lower such as about 1:80.

The carbon blacks can include any of the commonly available, commercially-produced carbon blacks, but those having a surface area (EMSA) of at least 20 $m^2/g$ and, more preferably, at least 35 $m^2/g$ up to 200 $m^2/g$ or higher are preferred. Surface area values used in this application are determined by ASTM D-1765 using the cetyltrimethyl-ammonium bromide (CTAB) technique. Among the useful carbon blacks are furnace black, channel blacks and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. Examples of exemplary carbon blacks include those bearing ASTM designation (D-1765-82a) N-110, N-220, N-339, N-330, N-351, N-550, and N-660. In one or more embodiments, the carbon black may include oxidized carbon black. A mixture of two or more of the above blacks can be used in preparing the rubber compositions disclosed herein. The carbon blacks utilized in the preparation of the rubber compositions disclosed herein can be in pelletized form or an unpelletized flocculent mass. Preferably, for more uniform mixing, unpelletized carbon black is preferred.

Examples of suitable silica reinforcing fillers include, but are not limited to, precipitated amorphous silica, wet silica (hydrated silicic acid), dry silica (anhydrous silicic acid), fumed silica, calcium silicate, and the like. Other suitable fillers include aluminum silicate, magnesium silicate, and the like. Among these, precipitated amorphous wet-process, hydrated silicas are preferred. These silicas are so-called precipitated because they are produced by a chemical reaction in water, from which they are precipitated as ultra-fine, spherical particles. These primary particles strongly associate into aggregates, which in turn combine less strongly into agglomerates. The surface area, as measured by the BET method gives the best measure of the reinforcing character of different silicas. For silicas of interest for the present disclosure, the surface area should be about 32 $m^2/g$ to about 400 $m^2/g$, with the range of about 100 $m^2/g$ to about 250 $m^2/g$ being preferred, and the range of about 150 $m^2/g$ to about 220 $m^2/g$ being most preferred. The pH of the silica filler is generally about 5.5 to about 7 or slightly over, preferably about 5.5 to about 6.8.

Silica can be employed in the amount of about 5 to about 200 phr, preferably in an amount of about 5 to about 80 phr and, more preferably, in an amount of about 30 to about 80 phr. The useful upper range is limited by the high viscosity imparted by fillers of this type. Some of the commercially available silicas which can be used include, but are not limited to, Hi-Sil™ 190, Hi-Sil™ 210, Hi-Sil™ 215, Hi-Sil™ 233, Hi-Sil™ 243, and the like, produced by PPG Industries (Pittsburgh, Pa.). A number of useful commercial grades of different silicas are also available from Degussa Corporation (e.g., VN2, VN3), Rhone Poulenc (e.g., Zeosil™ 1165MP), and J. M. Huber Corporation.

The rubber compositions disclosed herein optionally include a silica coupling agent when silica is used as a reinforcing filler. Examples of suitable silica coupling agents include, but are not limited to, a mercaptosilane, a bis(trialkoxysilylorgano) polysulfide, a 3-thiocyanatopropyl trimethoxysilane, or the like, or any of the silica coupling agents that are known to those of ordinary skill in the rubber compounding art. Exemplary mercaptosilanes include, but are not limited to, 1-mercaptomethyltriethoxysilane, 2-mercaptoethyltriethoxysilane, 3-mercaptopropyltriethoxysilane, 3-mercaptopropylmethyl-diethoxysilane, 2-mercaptoethyltriproxysilane, 18-mercaptooctadecyldiethoxychlorosilane, and the like. Exemplary bis(trialkoxysilylorgano) polysulfide silica coupling agents include, but are not limited to, bis(3-triethoxysilyl-propyl) tetrasulfide (TESPT), which is sold commercially under the tradename Si69® by Degussa Inc., New York, N.Y., and bis(3-triethoxysilylpropyl) disulfide (TESPD) or Si75®, available from Degussa, or Silquest™ A1589, available from Crompton. The silica coupling agent can be present in an amount of 0.01% to 20% by weight based on the weight of the silica, preferably 0.1% to 15% by weight, and more preferably 1% to 10%. Compounding involving silica fillers is also disclosed in U.S. Pat. Nos. 6,221,943, 6,342,552, 6,348,531, 5,916,961, 6,252, 007, 6,369,138, 5,872,176, 6,180,710, 5,866,650, 6,228,908 and 6,313,210, the disclosures of which are incorporated by reference herein.

The rubber compositions disclosed herein are compounded or blended by using mixing equipment and procedures conventionally employed in the art, such as mixing the various vulcanizable polymer(s) with reinforcing fillers and commonly used additive materials such as, but not limited to, curatives such as vulcanizing agents, vulcanizing accelerators, anti-scorch agents, vulcanizing inhibitors, and combinations thereof (for a general disclosure of suitable vulcanizing agents one can refer to Kirk-Othmer, *Encyclopedia of Chemical Technology*, 3rd ed., Wiley Interscience, N.Y. 1982, Vol. 20, pp. 365-468, particularly "Vulcanization Agents and Auxiliary Materials" pp. 390-402); processing additives, such as oils; resins, including tackifying resins; plasticizers; pigments; additional fillers; fatty acid; zinc oxide; waxes; antioxidants; antiozonants; peptizing agents; and the like. As known to those skilled in the art, the additives mentioned above are selected and commonly used in conventional amounts.

In one or more embodiments, a rubber composition is disclosed comprising: from 5 to 100 phr of first copolymer, wherein the first copolymer comprises a styrene monomer derived from a biobased styrene source material and at least one conjugated diene-containing monomer, wherein the styrene monomer contains 50% to 100% modern carbon atoms; from 0 to 95 phr of a second polymer or copolymer selected from the group consisting of polyisoprene, polybutadiene, emulsion styrene-butadiene copolymer, solution styrene-butadiene copolymer, natural rubber, and combinations thereof; and from 5 to 200 phr of at least one reinforcing filler. In certain embodiments, the first copolymer contains 100% modern carbon atoms, and any of the polyisoprene, polybutadiene, emulsion styrene-butadiene copolymer, and solution styrene-butadiene copolymer present in the second polymer or copolymer is 100% modern carbon atoms. Furthermore, in accordance with certain embodiments, the rubber composition may also include from 0 to 75 phr, and preferably from 0 to 40 phr of processing oils/aids; from 0 to 10 phr, and preferably from 0 to 5 phr of antidegradants; from 0 to 5 phr, and preferably from 0 to 3 phr of stearic acid; from 0 to 10 phr, and preferably from 0 to 5 phr of zinc oxide; from 0 to 10 phr, and preferably from 0 to 4 phr of a vulcanizing agent such as sulfur; from 0 to 10 phr, and preferably from 0 to 5 phr of vulcanizing accelerators; and when silica is used, from 0.01% to 20% by weight of a silica coupling agent based on the weight of the silica, preferably 0.1% to 15% by weight, and more preferably 1% to 10%.

In one or more embodiments, a tire component of this disclosure comprises a rubber composition comprising: from 5 to 100 phr of first polymer or copolymer, wherein the first polymer or copolymer is based upon a styrene monomer derived from a biobased styrene source material and optionally at least one conjugated diene-containing monomer, wherein the styrene monomer contains 50% to 100% modern carbon atoms; from 0 to 95 phr of a second polymer or copolymer selected from the group consisting of polyisoprene, polybutadiene, emulsion styrene-butadiene copolymer, solution styrene-butadiene copolymer, natural rubber, and combinations thereof; and from 5 to 200 phr of at least one reinforcing filler. In certain embodiments, the first polymer or copolymer copolymer contains 100% modern carbon atoms, and any of the polyisoprene, polybutadiene, emulsion styrene-butadiene copolymer, and solution styrene-butadiene copolymer present in the second polymer or copolymer is 100% modern carbon atoms. Furthermore, in accordance with certain embodiments, the rubber composition may also include from 0 to 75 phr, and preferably from 0 to 40 phr of processing oils/aids; from 0 to 10 phr, and preferably from 0 to 5 phr of antidegradants; from 0 to 5 phr, and preferably from 0 to 3 phr of stearic acid; from 0 to 10 phr, and preferably from 0 to 5 phr of zinc oxide; from 0 to 10 phr, and preferably from 0 to 4 phr of a vulcanizing agent such as sulfur; from 0 to 10 phr, and preferably from 0 to 5 phr of vulcanizing accelerators; and when silica is used, from 0.01% to 20% by weight of a silica coupling agent based on the weight of the silica, preferably 0.1% to 15% by weight, and more preferably 1% to 10%.

In addition, in certain of the preceding embodiments, the rubber composition of the present disclosure comprises at least a first styrene-butadiene copolymer and a second styrene-butadiene copolymer, where each of the first and second styrene-butadiene copolymers is polymerized from the bioderived styrene monomer, and where the percent bound styrene in the first styrene-butadiene copolymer is different than the percent bound styrene in the second styrene-butadiene copolymer. In additional embodiments, the rubber composition includes a third polymer selected from the group consisting of styrene-butadiene copolymer, polybutadiene, natural rubber, and polyisoprene.

In one or more embodiments, the rubber compositions disclosed herein are prepared by forming an initial masterbatch that includes the rubber component, i.e., the polymer or copolymer disclosed herein along with any additional conjugated diene polymer or copolymer, and filler. In one or more embodiments, where silica is employed as a filler (alone or in combination with other fillers), a coupling and/or shielding agent may be added to the rubber formulation during mixing. This initial masterbatch may be mixed at a starting temperature of from about 25° C. to about 125° C. with a discharge temperature of about 135° C. to about 180° C. To prevent premature vulcanization (also known as scorch), this initial masterbatch may exclude vulcanizing agents. Once the initial masterbatch is processed, the vulcanizing agents may be introduced and blended into the initial masterbatch at low temperatures in a final mix stage, which preferably does not initiate the vulcanization process. Optionally, additional mixing stages, sometimes called remills, can be employed between the masterbatch mix stage and the final mix stage. Various ingredients including polymers and copolymers can be added during these remills.

Where the vulcanizable rubber compositions are employed in the manufacture of tires, these compositions can be processed into tire components according to ordinary tire manufacturing techniques including standard rubber shaping, molding, and curing techniques. Any of the various rubber tire components can be fabricated including, but not limited to, treads, sidewalls, belt skims, and carcass. Typically, vulcanization is effected by heating the vulcanizable composition in a mold; e.g., it may be heated to about 140° C. to about 180° C. Cured or crosslinked rubber compositions may be referred to as vulcanizates, which generally contain three-dimensional polymeric networks that are thermoset. The other ingredients, such as processing aides and fillers, may be evenly dispersed throughout the vulcanized network. Pneumatic tires can be made as discussed in U.S. Pat. Nos. 5,866,171, 5,876,527, 5,931,211, and 5,971,046, which are incorporated herein by reference.

Methods for Balancing Viscoelastic Properties of a Rubber Composition

As previously discussed, the present disclosure includes methods for balancing the viscoelastic properties of a rubber composition comprising incorporation of at least 50 phr of a polymer or copolymer as previously described, i.e., based upon styrene monomer and optionally including conjugated-diene monomer, wherein the polymer or copolymer comprises at least 50 weight percent of the styrene monomer, and the styrene monomer contains 50-100% modern carbon atoms.

In certain embodiments, the viscoelastic properties balanced are rolling resistance and wet traction, and the balancing comprises increasing wet traction while maintaining or decreasing rolling resistance, as compared to a control rubber composition that replaces the modern carbon-containing polymer or copolymer with a polymer or copolymer containing no modern carbon atoms. In other embodiments, the polymer or copolymer containing a monomer with 50% to 100% modern carbon atoms is head or tail functionalized, the viscoelastic properties balanced are rolling resistance and wet traction, and the balancing comprises increasing wet traction without a commensurate increase in rolling resistance, as compared to a control rubber composition that replaces the modern carbon-containing polymer or copolymer with a polymer or copolymer containing no modern carbon atoms.

Exemplary Embodiments

In accordance with one or more embodiments, a styrene monomer derived from a biobased styrene source material is disclosed. The styrene monomer comprises 50% to 100% modern carbon atoms. In accordance with certain embodiments, the biobased styrene source material includes at least one of cinnamic acid, a derivative of cinnamic acid, syngas, methane, ethanol, butanol, and combinations thereof. In certain of the preceding embodiments, the biobased styrene source material is hydrocinnamic acid. Furthermore, in certain of the preceding embodiments, the styrene monomer contains 100% modern carbon atoms. A copolymer selected from the group consisting of styrene-butadiene, styrene-isoprene, and styrene-isoprene-butadiene can be produced from the styrene monomer of any of the preceding embodiments. In addition, in certain of the preceding embodiments, a tire component comprises the aforementioned copolymer.

In accordance with one or more embodiments, a polymer or copolymer produced from a styrene monomer derived from a biobased styrene source material is disclosed. The styrene monomer contains 50% to 100% modern carbon atoms. In accordance with certain of the preceding embodiments, the copolymer is selected from the group consisting of styrene-butadiene, styrene-isoprene, and styrene-isoprene-butadiene. In certain of the preceding embodiments, the styrene monomer is derived from at least one of cinnamic acid, a derivative of cinnamic acid, syngas, methane, ethanol, butanol, and combinations thereof. Furthermore, in certain of the preceding embodiments, the styrene monomer contains 100% modern carbon atoms. In addition, in one or more of the preceding embodiments, the copolymer is produced from at least one conjugated diene-containing monomer. In accordance with certain of the preceding embodiments, the polymer or copolymer is produced from the styrene monomer using anionic polymerization or emulsion polymerization.

Moreover, in certain of the preceding embodiments, the copolymer is a styrene-butadiene copolymer produced from the styrene monomer. In certain embodiments, the styrene-butadiene copolymer contains 5% to 60% modern carbon atoms. In certain of the preceding embodiments, the styrene-butadiene copolymer is produced from a 1,3-butadiene monomer derived from a biobased butadiene source material, and the butadiene monomer contains 25% to 100% modern carbon atoms. In accordance with certain of the preceding embodiments, the styrene-butadiene copolymer contains 25% to 100% modern carbon atoms. In certain preceding embodiments, the styrene-butadiene copolymer contains 50% to 99.99% modern carbon atoms. Furthermore, in certain of the preceding embodiments, the styrene-butadiene copolymer contains 10% to 60% of bound styrene by weight of the copolymer. In certain preceding embodiments, the styrene-butadiene copolymer contains 20% to 40% of bound styrene by weight of the copolymer. Up to 60% by weight of the total styrene in the copolymer is present in microblock form in accordance with certain of the preceding embodiments.

In addition, in certain of the preceding embodiments, the copolymer is a styrene-isoprene copolymer produced from the styrene monomer. The styrene-isoprene copolymer is produced from an isoprene monomer derived from a biobased isoprene source material, and the isoprene monomer contains 25% to 100% modern carbon atoms.

In accordance with certain of the preceding embodiments, the copolymer is a styrene-isoprene-butadiene copolymer produced from the styrene monomer. In certain of the preceding embodiments, the styrene-isoprene-butadiene copolymer contains 5% to 60% modern carbon atoms. Furthermore, in certain of the preceding embodiments, the styrene-isoprene-butadiene copolymer is produced from at least one of a 1,3-butadiene monomer derived from a biobased butadiene source material, an isoprene monomer derived from a biobased isoprene source material, and combinations thereof. When the styrene-isoprene-butadiene copolymer is produced from a biobased butadiene source material, the 1,3-butadiene monomer contains 25% to 100% modern carbon atoms. In addition, when the styrene-isoprene-butadiene copolymer is produced from a biobased isoprene source material, the isoprene monomer contains 25% to 100% modern carbon atoms. In accordance with certain of the preceding embodiments, the styrene-isoprene-butadiene copolymer contains 25% to 100% modern carbon atoms when the styrene-isoprene-butadiene copolymer is produced from both a biobased butadiene source material and a biobased isoprene source material. In certain of the preceding embodiments, the styrene-isoprene-butadiene copolymer contains 50% to 99.99% modern carbon atoms when the styrene-isoprene-butadiene copolymer is produced from both a biobased butadiene source material and a biobased isoprene source material. In accordance with certain of the preceding embodiments, the styrene-isoprene-butadiene copolymer contains 10 to 60% of bound styrene by weight of the copolymer. Furthermore, in certain of the preceding embodiments, the styrene-isoprene-butadiene copolymer contains 20% to 40% of bound styrene by weight of the copolymer.

In addition, in accordance with certain of the preceding embodiments, the polymer or copolymer is functionalized at one or more of the polymer head, the polymer tail, and the polymer backbone. Moreover, in accordance with certain of the preceding embodiments, a tire component comprises the aforementioned polymer or copolymer. In certain of the preceding embodiments, the polymer or copolymer is present in the tire tread of the tire component. Furthermore, in accordance with certain of the preceding embodiments, the styrene monomer is polymerized with a conjugated diene-containing monomer selected from the group consisting of 1,3-butadiene, isoprene, 1,3-pentadiene, 2,3-dimethyl-1,3-butadiene, 1,3-hexadiene, 2-methyl-1,3-pentadiene, 3,4-dimethyl-1,3-hexadiene, 4,5-diethyl-1,3-octadiene, 3-butyl-1,3-octadiene, phenyl-1,3-butadiene, and combinations thereof. In addition, in certain of the preceding embodiments, the copolymer is a styrene-butadiene-styrene (SBS) block copolymer or a styrene-isoprene-styrene (SIS) block copolymer.

In accordance with one or more embodiments, a tire component comprising a rubber composition is disclosed. The rubber composition comprises from 5 to 100 phr of first polymer or copolymer, from 0 to 95 phr of a second polymer or copolymer, and from 5 to 200 phr of at least one reinforcing filler. The first polymer or copolymer comprises a styrene monomer derived from a biobased styrene source material and optionally at least one conjugated diene-containing monomer. The styrene monomer contains 50% to 100% modern carbon atoms. The second polymer or copolymer selected from the group consisting of polyisoprene, polybutadiene, emulsion styrene-butadiene copolymer, solution styrene-butadiene copolymer, natural rubber, and combinations thereof. Furthermore, in accordance with certain of the preceding embodiments, the first copolymer contains 100% modern carbon atoms, and any of the polyisoprene, polybutadiene, emulsion styrene-butadiene copolymer, and solution styrene-butadiene copolymer present in the second polymer or copolymer is 100% modern carbon atoms.

In accordance with certain of the preceding embodiments, the rubber composition is contained in a tread, a sidewall, or both a tread and a sidewall. In accordance with certain of the preceding embodiments, the rubber composition comprises from 20 to 100 phr of the first polymer or copolymer and from 0 to 80 phr of the second copolymer. In addition, in certain of the preceding embodiments, the first polymer or copolymer of the rubber composition is selected from the group consisting of styrene-butadiene, styrene-isoprene, styrene-isoprene-butadiene, and combinations thereof. In accordance with the preceding embodiment, the rubber composition is contained in a tire tread. Furthermore, in accordance with certain of the preceding embodiments, the biobased styrene source material includes at least one of cinnamic acid, a derivative of cinnamic acid, syngas, methane, ethanol, butanol, and combinations thereof.

Furthermore, in certain of the preceding embodiments, the styrene monomer contains 100% modern carbon atoms. Moreover, in accordance with certain of the preceding embodiments, the first copolymer is produced from the styrene monomer using anionic polymerization or emulsion polymerization. In certain of the preceding embodiments, the first copolymer is a styrene-butadiene copolymer containing from 10% to 60% of bound styrene by weight of the copolymer. In accordance with certain of the preceding embodiments, the first copolymer is a styrene-butadiene copolymer containing from 20% to 40% of bound styrene by weight of the copolymer. In certain of the preceding embodiments, the first copolymer is a styrene-butadiene copolymer, and up to 60% by weight of the total styrene in the copolymer is present in microblock form.

Furthermore, in certain of the preceding embodiments, the first copolymer is a styrene-butadiene copolymer produced from a 1,3-butadiene monomer derived from a biobased butadiene source material. The 1,3-butadiene monomer contains 25% to 100% modern carbon atoms.

Moreover, in certain of the preceding embodiments, the first copolymer is a styrene-isoprene copolymer produced from an isoprene monomer derived from a biobased isoprene source material, wherein the isoprene monomer contains 25% to 100% modern carbon atoms.

Furthermore, in certain of the preceding embodiments, the first copolymer is a styrene-isoprene-butadiene copolymer and the styrene-isoprene-butadiene copolymer is produced from at least one of a 1,3-butadiene monomer derived from a biobased butadiene source material, an isoprene monomer derived from a biobased isoprene source material, and combinations thereof. When the styrene-isoprene-butadiene copolymer is produced from a biobased butadiene source material, the 1,3-butadiene monomer contains 25% to 100% modern carbon atoms. In addition, when the styrene-isoprene-butadiene copolymer is produced from a biobased isoprene source material, the isoprene monomer contains 25% to 100% modern carbon atoms.

In certain of the preceding embodiments, the reinforcing filler of the rubber composition is selected from the group consisting of carbon black, silica, clay, mica, starch, magnesium hydroxide, aluminum hydroxide, zinc oxide, and combinations thereof. In addition, in certain of the preceding embodiments, the rubber composition further comprises a curative selected from the group consisting of vulcanizing agents, vulcanizing accelerators, anti-scorch agents, vulcanizing inhibitors, and combinations thereof.

In accordance with one or more embodiments, a process for producing a conjugated diene-containing copolymer is disclosed. The process comprises providing a bioderived styrene monomer containing 50% to 100% modern carbon atoms; and polymerizing the styrene monomer in the presence of at least one conjugated-diene monomer to form a conjugated diene-containing copolymer. In accordance with certain of the preceding embodiments, the styrene monomer is polymerized in the presence of 1,3-butadiene monomer thereby forming a styrene-butadiene copolymer. In certain of the preceding embodiments, the styrene monomer is polymerized in the presence of isoprene monomer thereby forming a styrene-isoprene copolymer. Furthermore, in certain of the preceding embodiments, the styrene is polymerized in the presence of 1,3-butadiene monomer and an isoprene monomer thereby forming a styrene-isoprene-butadiene copolymer. In addition, in certain of the preceding embodiments, the copolymer is functionalized at one or more of the polymer head, the polymer tail, and the polymer backbone.

In accordance with certain of the preceding embodiments, the polymerizing step of the process is anionic polymerization. In certain of the preceding embodiments, the anionic polymerization comprises the use of at least one organometallic anionic initiator. In certain of the preceding embodiments, the at least one organometallic anionic initiator is an organic alkali metal compound. In accordance with certain of the preceding embodiments, the at least one organometallic anionic initiator is selected from the group consisting of organolithium, organomagnesium, organosodium, organopotassium, tri-organotin-lithium compounds, and combinations thereof.

In accordance with certain of the preceding embodiments, the polymerizing step of the process is emulsion polymerization. In certain of the preceding embodiments, the emulsion polymerization occurs at from 0 to 10° C.

Furthermore, in accordance with certain of the preceding embodiments, the tire component comprises a rubber composition containing the conjugated diene copolymer produced by the aforementioned process. In accordance with certain preceding embodiments, the rubber composition is contained in a tire tread. In addition, in certain of the preceding embodiments, the rubber composition further comprises 5 to 95 phr of a second polymer or copolymer selected from the group consisting of polyisoprene, polybutadiene, emulsion styrene-butadiene copolymer, solution styrene-butadiene copolymer, natural rubber, and combinations thereof; and 5 to 200 phr of at least one reinforcing filler. Moreover, in accordance with certain of the preceding embodiments, the rubber composition comprises at least a first styrene-butadiene copolymer and a second styrene-butadiene copolymer. In accordance with the preceding embodiment, each of the first and second styrene-butadiene copolymers is polymerized from the bioderived styrene monomer, and the percent bound styrene in the first styrene-butadiene copolymer is different than the percent bound styrene in the second styrene-butadiene copolymer.

EXAMPLES

The following examples illustrate specific and exemplary embodiments and/or features of the embodiments of the present disclosure. The examples are provided solely for the purposes of illustration and should not be construed as limitations of the present disclosure. Numerous variations over these specific examples are possible without departing from the spirit and scope of the presently disclosed embodiments.

Example 1

Preparation of Biobased Styrene

In a dinitrogen atmosphere glovebox, biobased hydrocinnamic acid (1 gram, 6.7 millimoles), palladium(II) chloride (3 milligram, 0.25 mole %), pivalic anhydride (1.35 milliliter, 6.7 millimoles), and phosphine ligand (2.2 mole % or 4.4 mole %) are loaded into an oven-dried 15 milliliter round-bottom flask equipped with a Teflon stir bar. Not all of the reagents are soluble at room temperature, resulting in a heterogeneous mixture. The round-bottom flask is attached to an oven-dried short-path distillation apparatus, then removed from the glovebox and placed under an atmosphere of dinitrogen or argon gas. The reaction flask is lowered into a 160° C. to 170° C. oil bath and allowed to continue to heat until the oil bath reached 190° C. In most cases, the reaction mixture becomes homogenous and yellow after heating. Once the reaction mixture reaches about 185° C., it begins to bubble vigorously, thereby indicating loss of carbon monoxide. As the reaction proceeds for two hours, the distillate of the reaction mixture is collected. After the two hours, heating is ceased and the reaction is exposed to air. The distillate is colorless and includes styrene, pivalic acid, and pivalic anhydride. The residual reaction mixture is yellow and contains the catalyst residue and any unreacted raw materials not present in the distillate.

The distillate comprising styrene (3.13 grams, 30.0 millimoles), pivalic acid (6.35 grams, 62.1 millimoles), and pivalic anhydride (0.63 grams, 3.4 millimoles) is diluted with 35 milliliters of pentanes and is washed with a 1.7 M aqueous NaOH solution (3×50 mL) The organic phase is diluted with an additional 15 milliliters of pentanes and is dried over $MgSO_4$. The mixture is then filtered, and after filtration, the solvent is removed thus providing a mixture of styrene and pivalic anhydride (as characterized by $^1$H NMR spectroscopy) that is then chromatographed (column diameter of 5 centimeter, and column height of 25 centimeter) on silica using pentane as the eluent to yield biobased styrene (2.03 grams, 65%).

Example 2

Anionic Polymerization of Styrene-butadiene Copolymer

To a dinitrogen purged and capped bottle is added 360 grams of hexane, 12 grams of biobased styrene and 28 grams of 1,3-butadiene. The biobased styrene is prepared in the manner described above in Example 1 of this disclosure. Then, 0.24 milliliters of 1.65 M BuLi (0.4 millimoles) is added with 0.12 millimoles 2,2-ditetrahydrofurylpropane. The bottle is placed in a 50° C. bath for 4 hours. After the 4 hours elapses, 1 milliliter of isopropanol (IPA) is added to quench the reaction and the bottle contents are discharged into a mixture of IPA and 2,6-di-tert-butyl-4-methylphenol (BHT). The resultant styrene-butadiene copolymer has a 5% to 60% modern carbon atom content as measured by ASTM D6866.

Example 3

Emulsion Polymerization of Styrene-butadiene Copolymer

To a dinitrogen purged and capped bottle is added 180 grams of distilled water, 5 grams of sodium stearate, 25 grams of biobased styrene, 75 grams of 1,3-butadiene, 0.2 grams of dodecylmercaptan, 0.017 g of iron (II) sulfate, 0.06 g of ethylenediamine tetraacetic acid (EDTA), and 0.17 grams of cumene hydroperoxide. The biobased styrene is prepared in the manner described above in Example 1 of this disclosure. The bottle is placed in a 5° C. bath for 12 hours. Then, 0.4 grams of a 1M BHT solution in hexanes is added and the solution is discharged into a 1 M sulfuric acid solution. The resultant styrene-butadiene copolymer has a 5% to 60% modern carbon atom content as measured by ASTM D6866.

Example 4

Anionic Polymerization of Styrene-butadiene Copolymer (Using Biobased Styrene Monomer and Biobased 1,3-butadiene Monomer)

A styrene-butadiene copolymer is made according to the process provided in Example 2 except that both the styrene monomer and the 1,3-butadiene monomer are biobased. The biobased styrene is prepared in the manner described above in Example 1 of this disclosure. The biobased 1,3-butadiene monomer is prepared from biobased ethanol in accordance with the process described in Toussaint, W. J. et al., "Production of Butadiene from Alcohol," *Ind. Eng. Chem.*, 1947, 39 (2), pages 120-125. The resultant styrene-butadiene copolymer has a 25% to 100% modern carbon atom content as measured by ASTM D6866.

Example 5

Emulsion Polymerization of Styrene-butadiene Copolymer (Using Biobased Styrene Monomer and Biobased 1,3-butadiene Monomer)

A styrene-butadiene copolymer is made according to the process provided in Example 3 except that both the styrene monomer and the 1,3-butadiene monomer are biobased. The biobased styrene is prepared in the manner described above in Example 1 of this disclosure. The biobased 1,3-butadiene monomer is prepared from biobased ethanol in accordance with the process described in Toussaint, W. J. et al., "Production of Butadiene from Alcohol," *Ind. Eng. Chem.,* 1947, 39 (2), pp. 120-125. The resultant styrene-butadiene copolymer has a 25% to 100% modern carbon atom content as measured by ASTM D6866.

Example 6

Anionic Polymerization of Styrene-Isoprene-Butadiene Copolymer

A monomer solution in hexane containing 20% by weight of biobased styrene, 40% by weight 1,3-butadiene, and 40% by weight isoprene is dried in a column packed with silica, alumina, a molecular sieve, and sodium hydroxide resulting in a monomer solution in hexane having 18.4% by weight solids. The biobased styrene is prepared in the manner described above in Example 1 of this disclosure. The resulting monomer solution is charged in a dinitrogen purged and sealed 3.8 liter reactor. Then, 3.07 milliliter of a potassium p-amylate solution (0.68 M in hexane) and 2 milliliter of n-butyllithium (1.04 M in hexane) is charged into the reactor. The reactor is maintained at a temperature of 50° C. with agitation for 7-8 hours, after which 2 milliliter of methyl alcohol is added to quench the reaction and form a styrene-isoprene-butadiene copolymer cement. Then, 1 phr of an antioxidant is added to the resulting cement. The hexane is evaporated in a vacuum oven at 50° C. overnight. The resulting styrene-butadiene-isoprene copolymer has 18% bound styrene units, 16% bound 1,2-butadiene units, 24% bound 1,4-butadiene units, 18% bound 3,4-polyisoprene units, 24% bound 1,4-polyisoprene units, and 2% bound 1,2-isoprene units. The resultant styrene-isoprene-butadiene copolymer has a 5% to 60% modern carbon atom content as measured by ASTM D6866.

Example 7

Production of Biobased Styrene-butadiene Copolymer

A quantity of biobased styrene (97% modern carbon) was provided. The styrene was described as having been produced from biobased hydrocinnamic acid. This biobased styrene was utilized to prepare samples of styrene-butadiene copolymer (SBR), according to the procedures described below in 7B and 7C. A control sample of SBR using non-biobased (i.e., fossil fuel derived) styrene was prepared according to the procedures described below in 7A. The samples according to 7A, 7B and 7C were produced using non-biobased (i.e., fossil fuel derived) 1,3-butadiene. Once produced, the SBRs were subjected to various analysis. Results appear in Table 1 below. Percent biobased carbon analysis was performed upon the SBR samples using ASTM D6866-12. The values disclosed for Mn and Mw were determined using GPC. The GPC measurements disclosed herein are calibrated with polystyrene standards and Mark-Houwink constants. The microstructure content disclosed herein (i.e., vinyl-contents (%)) were determined by FTIR, i.e., the samples were dissolved in CS2 and subjected to FTIR.

Sample 7A: Synthesis of SBR Using Fossil Fuel Derived Styrene and Butadiene. To a 0.8 liter dry, nitrogen purged, capped bottle was added 207.1 grams of anhydrous hexanes, 18.3 grams of 32.6 weight percent fossil fuel derived styrene in hexanes, and 178.9 grams of 19.0 weight percent 1,3-butadiene in hexanes. Then, 0.13 milliliter of 1.6 M n-butyl lithium (n-BuLi) in hexanes and 0.08 milliliter of 1.6 M 2,2-ditetrahydrofurylpropane (DTHFP) in hexanes were added and the bottle agitated in a 50° C. water bath. After 4 hrs, 0.1 milliters of isopropanol was added to the bottle. The polymer was coagulated in isopropanol containing antioxidant and drum dried to yield a polymer having the properties listed in Table 1.

Sample 7B: Synthesis of Non-Functionalized SBR Using Biobased Styrene. To a 0.8 liter dry, nitrogen purged, capped bottle was added 207.1 grams of anhydrous hexanes, 18.3 grams of 32.7 weight percent biobased styrene (97% modern carbon) in hexanes, and 178.9 grams of 19.0 weight percent 1,3-butadiene in hexanes. Then, 0.25 milliliters of 1.6 M n-BuLi in hexanes and 0.08 milliliters of 1.6 M 2,2-ditetrahydrofurylpropane (DTHFP) in hexanes were added and the bottle agitated in a 50° C. water bath. After 4 hrs, 0.1 milliliters of isopropanol was added to the bottle. The polymer was coagulated in isopropanol containing antioxidant and drum dried to yield a polymer having the properties listed in Table 1

Sample 7C: Synthesis of Functionalized SBR Using Biobased Styrene. To a 0.8 liter dry, nitrogen purged, capped bottle was added 215.9 grams of anhydrous hexanes, 36.7 grams of 32.7 weight percent biobased styrene (97% modern carbon) in hexanes, and 147.4 grams of 19.0 weight percent 1,3-butadiene in hexanes. Then, 0.25 milliliters of 1.6 M n-BuLi in hexanes and 0.08 milliliters of 1.6 M 2,2-ditetrahydrofurylpropane (DTHFP) and 0.13 milliliters of 2.78 M hexamethyleneimine in cyclohexane were added and the bottle agitated in a 50° C. water bath. After 4 hrs, the 0.1 milliliters of 0.25 M tin tetrachloride was added to the bottle. Thereafter, isopropanol was added to the bottle. The polymer was coagulated in isopropanol containing antioxidant and drum dried to yield a polymer with properties listed in Table 1.

TABLE 1

| Analysis of SBR | | | |
|---|---|---|---|
| Example | A | B | C |
| $M_n$ (kg/mol) | 252.7 | 208 | 98 |
| $M_w$ (kg/mol) | 267.7 | 284 | 151 |
| % Coupling | 0 | 0 | 38 |
| % Vinyl (BD = 100%) | 62 | 65.1 | 55.2 |
| Weight Percent Styrene | 14.2 | 14.9 | 29.5 |
| Tg, ° C. | −32.8 | −26.9 | −22.8 |
| % Biobased Carbon in Copolymer | 0 | 12 | 26 |

Example 8

Preparation of Rubber Compositions

The SBRs prepared in Examples 7A, 7B and 7C were utilized to prepare rubber compositions according to the formulas provided in Tables 2-4, below. Each rubber compound was prepared in three stages named initial, remill and final. In the initial part, the SBR from examples 7A, 7B or 7C was mixed with silica, an antioxidant, stearic acid, and aromatic oil.

The initial portion of the compound was mixed in a 65 gram Banbury mixer operating at 60 RPM and 133° C. First, polymer was placed in the mixer, and after 0.5 minutes, the remaining ingredients except the stearic acid were added. The stearic acid was then added after 3 minutes. These initials were mixed for 5-6 minutes. At the end of mixing the temperature was approximately 165° C. The sample was transferred to a mill operating at a temperature of 60° C., where it was sheeted and subsequently cooled to room temperature.

TABLE 2

Initial Formulation

| Ingredient | Example 8A (Control)* | Example 8B* | Example 8C* |
|---|---|---|---|
| Sample A | 60 | 0 | 0 |
| Sample B | 0 | 60 | 0 |
| Sample C | 0 | 0 | 60 |
| Natural Rubber | 40 | 40 | 40 |
| Silica | 52.5 | 52.5 | 52.5 |
| Oil | 10 | 10 | 10 |
| Aromatic Oil | 2 | 2 | 2 |
| Stearic Acid | 2 | 2 | 2 |
| Antiozonant | 0.95 | 0.95 | 0.95 |
| Total | 167.45 | 167.45 | 167.45 |

TABLE 3

Remill Formulation

| Ingredient | Example 8A-8C |
|---|---|
| Appropriate Initial | 167.45 |
| Silica | 5 |
| Silane Shielding Agent[1] | 2.5 |
| Total | 174.95 |

[1](bis(triethoxysilylpropyl)disulfide)

TABLE 4

Final Formulation

| Ingredient | Example 8A-8C |
|---|---|
| Appropriate Remill | 174.95 |
| Sulfur | 1.5 |
| Accelerators | 4.1 |
| Zinc Oxide | 2.5 |
| Total | 183.05 |

The remill was mixed by adding the initial ingredients and silane shielding agent to the mixer simultaneously. The initial mixer temperature was 95° C. and it was operating at 60 RPM. The final material was removed from the mixer after three minutes when the material temperature was 145° C. The sample was transferred to a mill operating at a temperature of 60° C., where it was sheeted and subsequently cooled to room temperature.

The final ingredients were mixed by adding the remill and the curative materials to the mixer simultaneously. The initial mixer temperature was 65° C. and it was operating at 60 RPM. The final material was removed from the mixer after 2.5 minutes when the material temperature was between 90-95° C. The finals were sheeted into Dynastat buttons and 6×6×0.075 inch sheets. The samples were cured at 171° C. for 15 minutes in standard molds placed in a hot press.

After preparation of the rubber compositions, various viscoelastic properties were measured. These measurements were performed according to the procedures described below. Results are reported in Table 5 below.

TABLE 5

| Property | Example 6 | Example 7 | Example 8 |
|---|---|---|---|
| ML1 + 4 (130° C.) | 58.6 | 25.6 | 66.1 |
| 200% Modulus @23° C. (MPa) | 7.997 | 8.507 | 7.619 |
| $T_b$ @23° C. (MPa) | 14.518 | 19.382 | 22.403 |
| $E_b$ @23° C. (%) | 270.483 | 300.132 | 333.981 |
| tan δ 5% E, 60° C. | 0.123 | 0.120 | 0.173 |
| ΔG' (50° C.) (MPa)* | 3.51 | 2.75 | 3.89 |
| tan δ 0.5% E, 0° C. | 0.309 | 0.340 | 0.630 |
| % Biobased Carbon | 0 | 12 | 26 |

The Mooney viscosities disclosed herein were determined at 130° C. using an Alpha Technologies Mooney viscometer with a large rotor, a one minute warm-up time, and a four minute running time. More specifically, the Mooney viscosity was measured by preheating a sample from each batch to 130° C. for one minute before the rotor starts. The Mooney viscosity was recorded for each sample as the torque at four minutes after the rotor started.

G' was measured by a strain sweep conducted with an Advanced Rheometric Expansion System (ARES) from TA Instruments. The test specimen has a cylindrical button geometry having a diameter of 9.27 mm and a 15.6 mm length. The test is conducted using a frequency of 15 Hz. The temperature is held constant at the desired temperature, 50° C. The strain was swept from 0.25% to 14.75%. ΔG' represents G'(0.25% E)–G'(14.5% E).

Tan δ was measured using a dynamic compression test done with a Dynastat™ mechanical spectrometer (Dynastatics Instruments Corp.; Albany, N.Y.) using a cylindrical test specimen (9.27 mm diameter×15.6 mm height). The temperature is held constant at the desired temperature, 50° C. The sample is compressed under a static load of 2 kg before testing. After it reached an equilibrium state, the test started with a dynamic compression load of 1.25 kg at a frequency of 15 Hz.

Tensile mechanical properties were determined following the guidelines, but not restricted to, the standard procedure described in ASTM-D412, using ring samples with a dimension of 1.27 mm in width and 1.91 mm in thickness. A specific gauge length of 25.4 mm was used for the tensile test. Specimens are strained at a constant rate and the resulting force is recorded as a function of extension (strain). Force readings are expressed as engineering stresses by reference to the original cross-sectional area of the test piece. The specimens are tested at 23° C. Breaking strength/tensile strength (Tb), elongation at break/elongation performance (Eb), Tb×Eb and modulus at 23° C. are also reported.

Notably, the viscosity (ML 1+4) of the SBR according to Example 7 was lower than the viscosity of the control SBR according to Example 6 (about 26 as compared to about 59). Without being bound by any theory, the lower viscosity may be due to a combination of higher Mw/Mn in Example 7 and the presence of a quantity of lower molecular weight material in the SBR of Example 7. The measurement of tan δ at 60° C. is commonly understood to provide an indication of a compound's rolling resistance (i.e., if incorporated into a tire tread) and the measurement of tan δ at 0° C. is commonly understood to provide an indication of a compound's wet traction (i.e., if incorporated into a tire tread). Generally, a polymer with a higher Tg will tend to provide a rubber composition with an increase in both tan δ values (i.e., an increase in the rolling resistance and an increase in wet traction). Increasing both of these (or decreasing both), especially in a tire tread, is generally undesirable as tire manufacturers usually seek to decrease rolling resistance and increase wet traction. As can be seen from an examination of the data in Table 5, the rubber composition according to Example 7 has an increase in wet traction (i.e., 0.340 versus 0.309), but also has a decrease in rolling resistance (i.e., 0.120 versus 0.123).

As to the rubber composition according to Example 8, it utilizes a functionalized SBR made from the bio styrene monomer; while the rubber composition according to Example 8 shows an increase in wet traction as compared to the non-functionalized control in Example 6 (i.e., 0.630 versus 0.309) that is unexpected since generally the use of a functionalized SBR would be expected to decrease the wet traction. Furthermore, with respect to Example 8, while there is an increase in rolling resistance (i.e., 0.173 versus 0.123), that increase is not as significant as would ordinarily be expected with the extent of the increase in wet traction. (The wet traction increases more than 100% as compared to Example 6 whereas the increase in rolling resistance is about 40%.)

Accordingly, from an examination of the viscoelastic properties provided in Table 5, it appears that the incorporation of biobased styrene into a SBR and subsequent use of that SBR in a rubber composition may allow for an improved balancing of viscoelastic properties in the rubber composition, more specifically an increase in wet traction without a corresponding increase in rolling resistance, and in certain instances an increase in wet traction accompanied by a decrease in rolling resistance.

Example 9

Analysis of Biobased Styrene Monomer

A sample of biobased styrene monomer containing 97% modern carbon, and described as having been produced from biobased hydrocinnamic acid, was analyzed for styrene monomer and impurities using GC-MS. According to the analysis, the monomer sample contained 98.8% styrene monomer and also contained certain styrene-based impurities. Fossil-fuel based styrene monomer sources are known to contain 99.8% styrene monomer, and, therefore, no more than 0.2% styrene-based impurities. The styrene-derived impurities identified in the biobased styrene monomer comprised styrene dimers, styrene trimers, and hydroxy-substituted styrene compounds. More specifically, the styrene-derived impurities were identified (using a standard library) as including ethylbenzene, 1-phenyl-ethanol, styrene dimer, styrene trimer, bis(1-phenyl-ethyl)ether, and 1,3-diphenyl-3-hydroxy-1-butene.

As used in the description of the invention and the appended claims, the singular forms "a," "an," and "the" are intended to include the plural forms as well, unless the context clearly indicates otherwise.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan1 A. Garner, *A Dictionary of Modern Legal Usage* 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

Unless otherwise indicated herein, all sub-embodiments and optional embodiments are respective sub-embodiments and optional embodiments to all embodiments described herein. While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus, and illustrative examples shown and described. Accordingly, departures may be made from such details without departing from the spirit or scope of the applicant's general inventive concept.

What is claimed is:

1. A method for increasing the wet traction of a rubber composition, the method comprising incorporating:
   a. 5-100 phr of at least one styrene-butadiene copolymer containing a styrene monomer with 50% to 100% modern carbon atoms;
   b. 0-95 phr of at least one additional polymer or copolymer selected from the group consisting of polyisoprene, polybutadiene, emulsion styrene-butadiene copolymer, solution styrene-butadiene copolymer, natural rubber, and combinations thereof; and
   c. 5-200 phr of at least one reinforcing filler, to form the rubber composition, wherein either:
   d. wet traction is increased while rolling resistance is decreased by at least 2% as compared to a control rubber composition that replaces the modern carbon-containing polymer or copolymer with a polymer or copolymer containing no modern carbon atoms; or
   e. wet traction is increased by more than 50% and rolling resistance is increased by less than 50% as compared to a control rubber composition that replaces the modern carbon-containing polymer or copolymer with a polymer or copolymer containing no modern carbon atoms.

2. The method of claim 1, wherein the at least one styrene-butadiene copolymer containing a styrene monomer with 50 to 100% modern carbon atoms is functionalized.

3. The method of claim 2, wherein the functionalization is at one or more of the head, the tail, or the polymer backbone.

4. The method of claim 2, wherein the functionalization is by coupling.

5. The method of claim 1, wherein (d) comprises an increase in wet traction of at least 10% as compared to a control rubber composition that replaces the modern carbon-containing polymer or copolymer with a polymer or copolymer containing no modern carbon atoms.

6. The method of claim 3, wherein the at least one styrene-butadiene copolymer containing a styrene monomer with 50% to 100% modern carbon atoms is present in the rubber composition in an amount of 20-100 phr.

7. The method of claim 1, wherein the styrene monomer contains at least 0.5% by weight styrene-derived impurities including styrene dimers, styrene trimers, and hydroxy-substituted styrene compounds.

8. The method of claim 1, wherein the styrene monomer is produced from cinnamic acid or a derivative thereof.

9. The method according to claim 1, wherein the at least one reinforcing filler includes 80 to 200 phr of silica filler.

10. The method of claim 1, wherein the at least one styrene-butadiene copolymer of (a) is present in the rubber composition in an amount of 20-100 phr.

11. The method of claim 1, wherein the at least one styrene- butadiene copolymer of (a) contains 10-60% bound styrene.

12. The method of claim 1, wherein the at least one styrene- butadiene copolymer of (a) contains 10-20% bound styrene.

13. The method of claim 1, wherein the rubber composition further comprises up to about 75 phr of a processing aid selected from oil, resin and a combination thereof.

14. The method of claim 1, wherein the processing aid comprises at least one resin in an amount of 40-75 phr.

15. The method of claim 1, wherein the at least one styrene-butadiene copolymer of (a) has a modern carbon atom content of 75% to about 99%.

16. The method of claim 1, wherein the at least one styrene-butadiene copolymer of (a) has a modern carbon atom content of 75 to about 97%.

17. The method according to claim 1, wherein the at least one reinforcing filler includes 80 to 200 phr of silica filler.

18. The method of claim 1, wherein (d) is met and the wet traction increase is about 10% to about 100%.

19. The method of claim 1, wherein (e) is met and the wet traction increase is more than 50% to about 100%.

20. The method of claim 1, wherein (e) is met and the rolling resistance increase is about 40% to less than 50%.

21. The method of claim 3, wherein (e) is met and the wet traction increase is more than 50% to about 100%.

22. The method of claim 1, wherein the at least one styrene-butadiene copolymer of (a) has a modern carbon atom content of 50 to about 97%.

* * * * *